Figure 1:
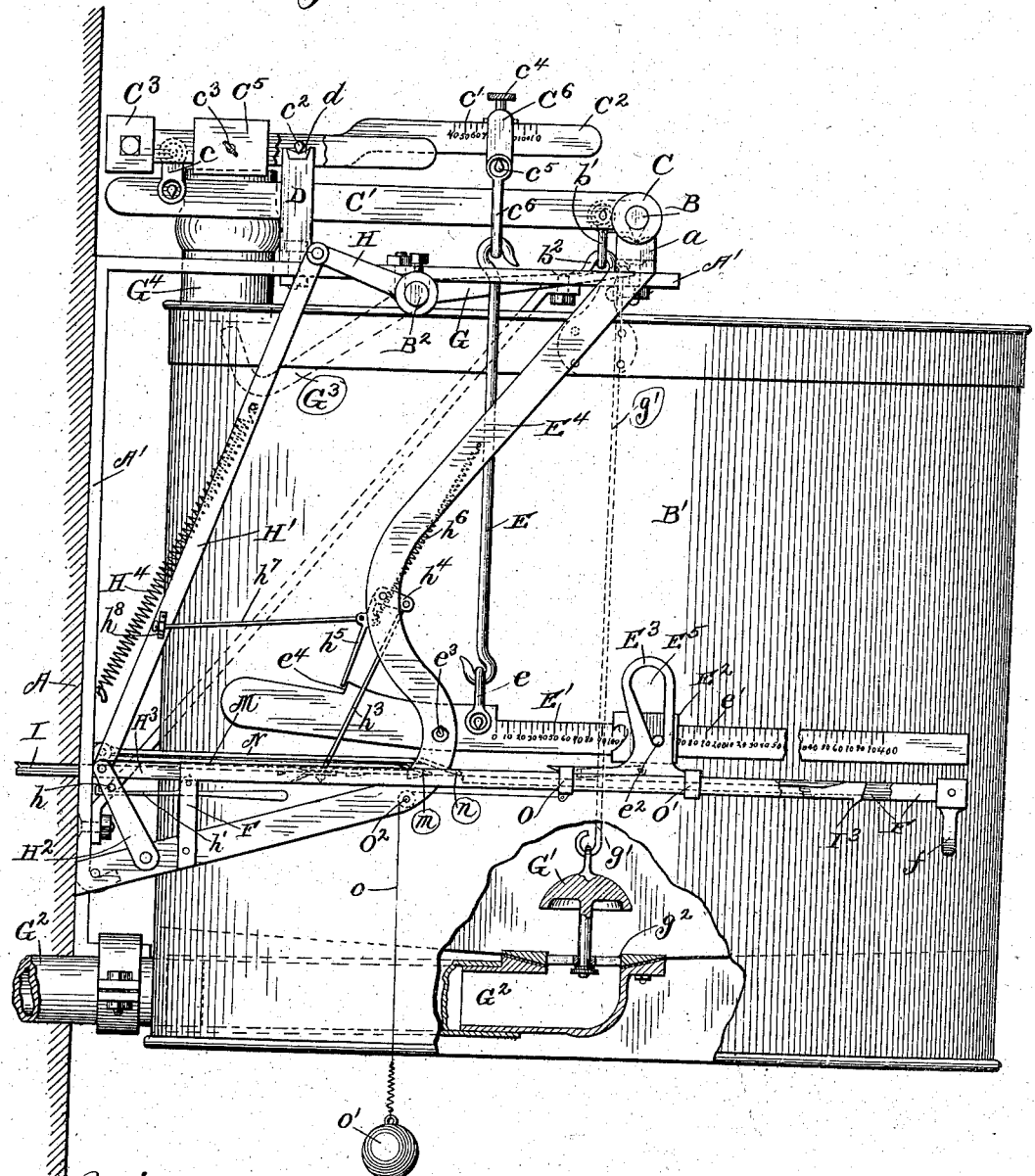

(No Model.) 3 Sheets—Sheet 1.

G. A. HANNA & T. A. SWANSON.
AUTOMATIC LIQUID WEIGHER.

No. 580,455. Patented Apr. 13, 1897.

Witnesses:
W. J. Jacker,
C. T. Duggan.

Inventors:
George A. Hanna and
By Theodore A. Swanson.
Chas. C. Tillman, Atty.

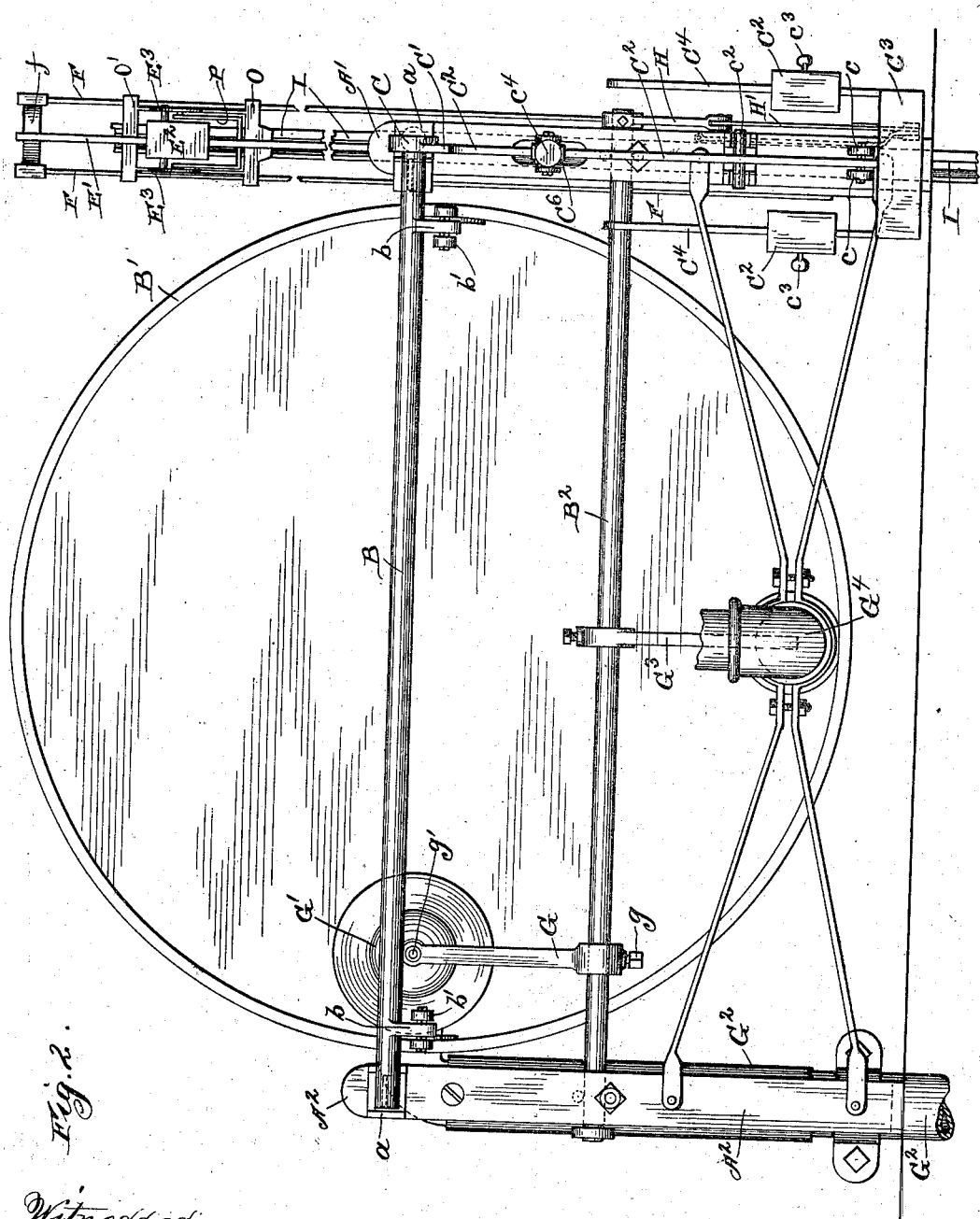

(No Model.) 3 Sheets—Sheet 3.
G. A. HANNA & T. A. SWANSON.
AUTOMATIC LIQUID WEIGHER.
No. 580,455. Patented Apr. 13, 1897.
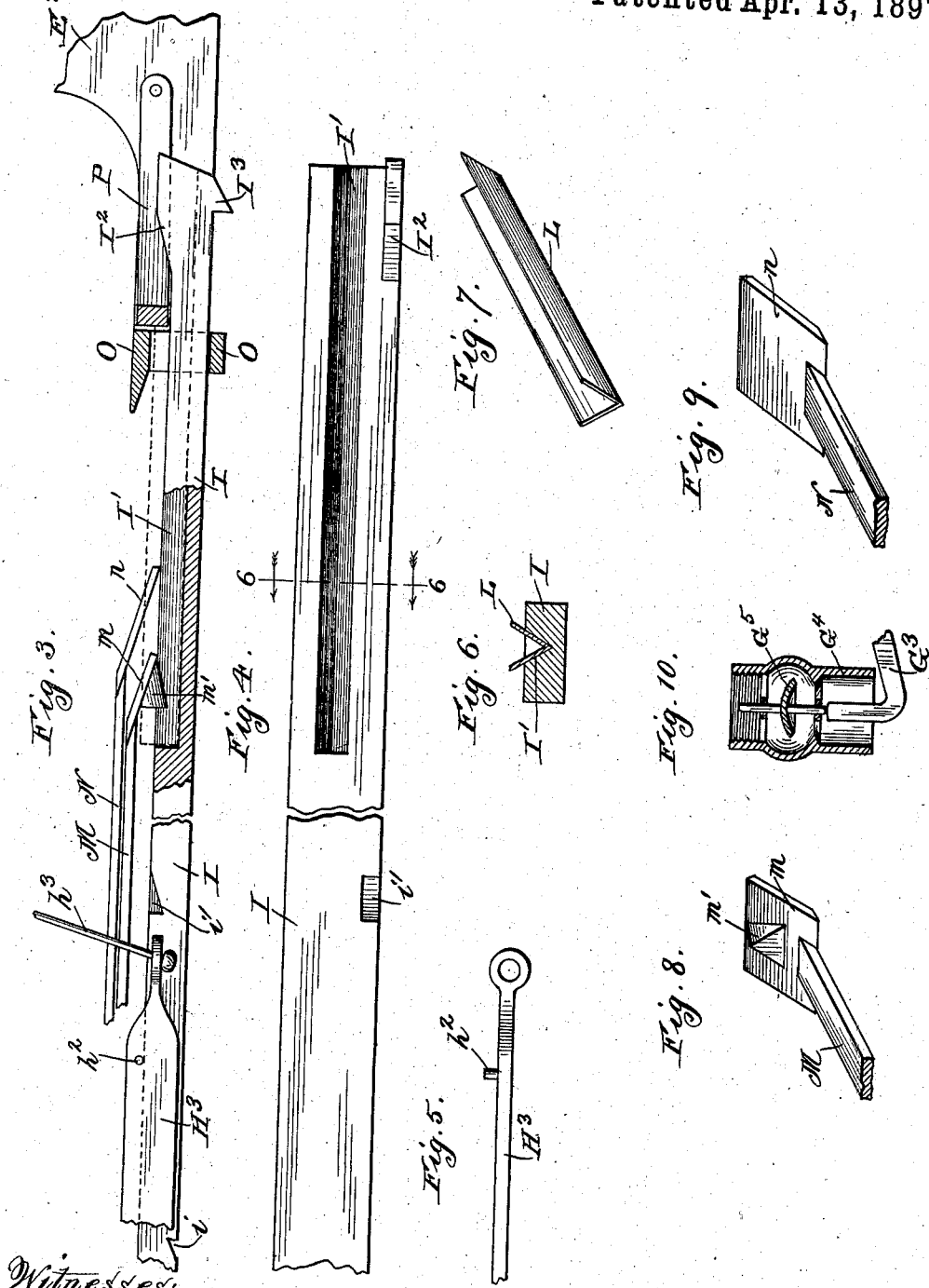

UNITED STATES PATENT OFFICE.

GEORGE A. HANNA AND THEODORE A. SWANSON, OF WHITTEMORE, IOWA.

AUTOMATIC LIQUID-WEIGHER.

SPECIFICATION forming part of Letters Patent No. 580,455, dated April 13, 1897.

Application filed August 24, 1896. Serial No. 603,684. (No model.)

*To all whom it may concern:*

Be it known that we, GEORGE A. HANNA and THEODORE A. SWANSON, citizens of the United States, residing at Whittemore, in the county of Kossuth and State of Iowa, have invented certain new and useful Improvements in Automatic Liquid-Weighers, of which the following is a specification.

This invention relates to improvements in an apparatus to be used for automatically weighing liquids, and while it is more especially designed to be used at creameries for weighing and delivering skimmed milk to the patrons thereof, yet it is applicable for other liquids; and it consists in certain peculiarities of the construction, novel arrangement, and operation of the various parts thereof, as will be hereinafter more fully set forth and specifically claimed.

It is generally the custom at creameries to deposit the milk received from the farmers or dairymen into a receiving-tank and to note the number of pounds of milk received from each individual, and after the process of separating the milk from the cream to deliver to each dairyman or farmer his pro rata of skimmed milk or a certain per cent. of the entire quantity which he has delivered to the creamery. In other words, the proprietors of the creameries deduct a predetermined amount or percentage from the gross weight of the milk received by them, which percentage represents the amount of cream from said quantity.

To weigh and deliver to the patrons of the creamery the skimmed milk has heretofore been a task of considerable difficulty, requiring much time and labor; and it is therefore the objects of our invention, first, to provide a weigher which shall be simple and inexpensive in construction, strong, durable, accurate, and reliable in operation, and, second, such a weigher which by reason of the peculiar construction and operation of its parts will automatically weigh and deliver the milk or liquid.

Another and one of the main objects of our invention is to so arrange the weigher that it will be inaccessible to the person who is to receive the skimmed milk, but may be readily operated and controlled by the insertion of a suitable check or piece into a grooved sliding bar, thus preventing the apparatus being tampered with and allowing the patron the exact quantity of milk or liquid due him.

In order to enable others skilled in the art to which our invention pertains to make and use the same, we will now proceed to describe it, referring to the accompanying drawings, in which—

Figure 1 is a view in side elevation, partly in section, of our weigher, showing the parts in the position they will occupy when the vessel is empty. Fig. 2 is a plan view. Fig. 3 is a longitudinal fragmental view, foreshortened for the convenience of illustration, of the grooved sliding bar, a portion of one of the securing-levers therefor, and parts of the ejector and guard for the controlling checks or pieces, and also a portion of the weight-mover. Fig. 4 is a plan view of a portion of the grooved sliding bar, showing it foreshortened for the convenience of illustration. Fig. 5 is a like view of a portion of one of the securing-levers. Fig. 6 is a cross-sectional view, taken on line 6 6 of Fig. 4, showing the grooved sliding bar with one of the controlling checks or pieces located in said groove. Fig. 7 is a perspective view of one of the controlling checks or pieces. Fig. 8 is an inverted perspective view of a portion of the guard for the controlling-checks. Fig. 9 is a similar view of a portion of the ejector for the controlling-checks, and Fig. 10 is a sectional view of the inlet-valve and a portion of the lever for operating the same.

Similar letters refer to like parts throughout the different views of the drawings.

A represents a portion of the wall of a room or other suitable support, upon which the weigher is mounted. To the wall or support A and at a proper distance apart are secured the rectangular brackets A' and A², on the upper surfaces of the outer ends of which are secured suitable blocks *a*, which may have their upper surfaces formed with V-shaped grooves to receive similarly-shaped projections on the rocking shaft B. The rocking shaft B is provided near its ends with arms *b*, to each of which are pivotally secured suitable hangers or rings *b'* to engage the hooks *b*², secured to the periphery of the vessel B' and diametrically opposite each other. On one end of the shaft B is rigidly fixed a collar C on the beam C', which is pivotally connected near its other end by means of links c to the adjusting-beam C², which is provided with a scale of graduating-marks c' of any desired denomination. On the bracket A' are vertically secured uprights or standards D, which are provided in their upper ends with V-shaped grooves d for the reception and operation of a similarly-shaped pin or fulcrum c² on the adjusting-beam. To the tail-block C³, fixed on the adjusting-beam C² and on each side of said beam and parallel therewith, are secured bars C⁴, on which are movably located counterbalancing-weights C⁵, each of which is provided with a thumb-screw c³ for securing it at the desired place to counterbalance the weight of the vessel B', which, as before stated, is suspended on the arms b' of the rocking shaft B. On the adjusting-beam C² is movably located an indicator C⁶, which is provided in its upper portion with a thumb-screw c⁴ for fixing the same at any desired point on the beam, and is provided in its lower part with a pin c⁵, on which is pivotally secured a hanger c⁶, which engages with the upper end of the rod E, the lower end of which rod is formed with a hook to engage the ring e, pivotally secured on the weighing-beam E', provided with a series of graduating-marks e' of any suitable denomination. On the weighing-beam E' is placed a sliding weight E², on each side of which is a projection e² to engage the weight-mover E³, as will be presently explained. The bracket A' is supported by means of two ogee-curved braces E⁴, in which the weighing-beam E' is fulcrumed, as at e³ in Fig. 1 of the drawings. Secured to the braces E⁴ and extending horizontally just below the fulcrum-point of the weighing-beam are two parallel bars F, which are connected at their free ends with a U-shaped piece f and act as a guideway or track for the weight-mover and grooved sliding bar.

Extending across the brackets A' and A² and having its bearings thereon is another rocking shaft B², to which is fixed near the bracket A² by means of a set-screw g a lever G, to the free end of which is connected a tie-rod g', which engages at its lower end with a gravity-valve G', whose seat g² is formed in the bottom of the vessel and communicates with an outlet-pipe G², which may be supported in any suitable manner and extends through the wall A of the room, at which point it may be provided with a cock or valve (not shown) to control the flow of the liquid therethrough.

About the middle of the rocking shaft B² is fixed an elbow-lever G³, whose upturned or free end extends into the inlet-pipe G⁴, which is located above the vessel B' and is provided with a gravity-valve G⁵, against the stem of which the free portion of the lever G³ will contact and raise it when it is desired to admit liquid to the vessel. On the end of the rocking shaft B² adjacent to the bracket A' is fixed another lever H, to the free end of which is pivotally secured one end of a rod or bar H', the other end of which is pivotally connected to a lever H², which is pivotally secured at its lower end on one of the braces E⁴, and carries a pin or projection h to engage the weighted detent h', which is pivotally secured on one of the bars F and engages a recess i in the lower surface of the sliding bar I and prevents said bar from being drawn outward until the vessel B' is emptied. At the juncture of the rod or bar H' and lever H² is pivotally secured one end of a securing-lever H³, which is provided near its other end with a pin or projection h², which normally rests on the upper surface of the sliding bar I and engages the recess i' therein. Connected to the free end of the lever H³ is a rod h³, whose upper end is pivotally secured to one arm h⁴ of a compound lever h⁵, which is fulcrumed on one of the braces E⁴ and is actuated by means of the spring h⁶, secured at one of its ends to said brace and at the other end to the lever. The arm or compound lever h⁵ has pivotally secured thereto at one end a rod h⁷, the other end of which rod is movably secured on the rod or bar H' by means of a bracket h⁸, which permits of some longitudinal and vertical movement of the rod h⁷ in the movement of the compound and securing levers.

As shown in Fig. 1 of the drawings, the bar H' is connected to the bracket A' by means of a spring H⁴, which normally retracts said rod to the position indicated in the last-named figure of the drawings. The inner upper portion of the sliding bar I is provided with a longitudinal groove I', which is preferably made V-shaped in cross-section and is adapted to receive the controlling checks or pieces L, which are made of metal and preferably V-shaped in cross-section to correspond with the shape of the groove in the sliding bar. The upper surface of the sliding bar I is provided at its inner end with an upwardly-inclined enlargement I², and the lower part of said end is formed with a rectangular projection I³ to engage and actuate the mover E³ for the weight E² on the weighing-beam. Just above the sliding bar I and pivotally secured to the bracket A' or otherwise, at one of their ends, are the guard M and ejector N for the controlling checks or pieces. The guard M is provided at its free end with a downwardly-inclined plate m, having on its lower surface a projection m', which is V-shaped in cross-section, or of such shape to correspond with the hollow or shape of the controlling-pieces when said pieces are of other form than V-shaped in cross-section. The free end of the ejector N is formed or provided with a downwardly-inclined plate n, which normally rests on the upper surface of the sliding bar and controlling pieces until the bar is drawn forward, when the said inclined plate will ride over and rest against the end of the controlling-piece adjacent to the wall, thus causing them to be forced out of the groove and to drop into a suitable receptacle, (not shown,)

which is located at a convenient place to receive them.

By reference to Figs. 1 and 3 of the drawings it will be observed that the guard M and ejector N lie parallel with one another, and that the guard is somewhat shorter than the ejector, and the projection $m'$ thereof will rest and travel within the V-shaped groove of the controlling checks or pieces and of the sliding bar.

Located on the horizontal tracks or bars F and extending crosswise thereof are the movable guides O and O', which form a part of the weight-mover and encompass transversely the sliding bar. These guides are connected near their ends and on each side of the weight $E^2$ by means of the weight-mover pieces $E^3$, which extend upwardly, and are provided with flaring openings $E^5$ for the reception and operation of the pins or projections $e^3$ on each side of the weight $E^2$ on the weighing-beam. The guide O is substantially in the form of a rectangular collar or band and completely encircles the bars or tracks F and the sliding bar I, while the guide O' is in the form of three sides of a rectangular collar or band and encompasses the bars F and sliding bar I at their top and sides only, thus leaving the bottom of said guide open, through which the projection $I^3$ on the sliding beam may pass.

Pivotally secured to the lower portion of the pieces $E^3$ is a U-shaped piece P, which rides on the sliding bar in the progress of the weight-mover, and its front portion forms an abutment for the end of the controlling-pieces, as shown by dotted lines in Fig. 3 of the drawings, yet will be raised by reason of the inclined portion $I^2$ of the sliding bar, so as to allow of the ejectment of the checks or controlling-pieces. These checks or controlling-pieces may be made of any suitable size and material and in any desired numbers, and may be kept in a case with compartments arranged for their reception, and may be numbered to indicate the number of pounds of milk to be delivered.

The operation of our invention is simple and as follows: The weights of the beams $C^4$ may be adjusted to counterbalance the weight of the vessel B', and the indicator $C^6$ placed at the proper point to indicate the percentage to be deducted from the gross amount of milk received. The sliding bar I is then drawn outwardly through an opening in the wall A until the groove therein is exposed, which operation will through the medium of the weight-mover $E^3$ move the weight on the weighing-beam to the cipher-mark, thus balancing the scales. One of the controlling-checks may then be placed in the groove I' in the sliding bar and the bar then forced inwardly through the opening in the wall, which operation will cause the inner end of the controlling-check to abut against the piece P on the weight-mover and move the weight to a point on the weighing-beam to correspond with the number of pounds indicated on the controlling-check. In sliding the bar I forward the pin $h^2$ on the lever $H^3$ will engage the recess $i'$ in the upper surface of the sliding bar, and as the lever $H^3$ is connected to the bar H' and lever $H^2$ will draw them forward, thus raising the elbow-lever $G^3$, which operates the valve $G^5$ in the inlet-pipe $G^4$, and at the same time will lower the lever G, to which is suspended the valve G', and close the outlet. The liquid will now flow into the vessel until a sufficient quantity thereof is deposited therein to cause the weighing-beam to tip at its rear end, which operation will release the arm $h^5$ of the compound lever from the catch $e^4$ on the weighing-beam, when the spring $h^6$ will retract the lever $h^5$ and through the medium of the rod $h^3$ raise the pin $h^2$ on the securing-lever $H^3$ from its recess in the sliding bar.

In the above-described operation as soon as the rod or bar H' and lever $H^2$ are drawn forward the dog or detent $h'$ will be disengaged from the pin $h$ on the lever $H^2$ and will rest on the lower surface of the sliding bar until it engages the recess $i$ therein, thus preventing the sliding bar being drawn outwardly. As soon as the pin $h^2$ on the securing-lever $H^3$ is released from its catch $i'$ in the sliding bar the spring $H^4$ will retract the bar H' and lever $H^2$ to the position shown in Fig. 1 of the drawings and thus raise the outlet-valve G' and close the inlet-valve $G^5$ and at the same time disengage the detent $h'$ from the sliding bar. When the milk thus having been weighed shall have been delivered from the vessel, the sliding bar may again be drawn outwardly, when the inclined plate $n$ on the ejector N will rest against the end of the controlling-check adjacent to the wall and force it from the groove in the sliding bar. It is obvious that as the bar is drawn outwardly the inclined portion $I^2$ thereof will raise the piece P out of contact with the controlling-check and thus offer no hindrance to its passage from the end of the bar. It is also apparent that the projection $I^3$ on the sliding bar will engage the guide O and thus draw the weight-mover forward on the tracks therefor. The projection $m'$ on the inclined plate $m$ of the guard M will rest within the groove or hollow of the controlling-piece L, when the same is in the groove of the sliding bar, and will prevent a check of any other form being used after the check has been ejected from the grooved sliding bar. The projection of the guard will travel back and forth within the groove, as is apparent.

Having thus fully described our invention, what we claim as new, and desire to secure by Letters Patent, is—

1. In an automatic liquid-weigher, the combination with the supporting-frame, of a rocking shaft mounted thereon, a vessel counterpoised on said shaft and having an outlet-valve in its lower part, a scale or weighing beam adjustably secured on and suspended from the counterpoise or adjusting beam, a movable weight on the weighing-beam, a sliding bar having means to engage and move said weight, the latter adapted to be operated by checks of variable lengths, substantially as described.

2. In an automatic liquid-weigher, the combination with the supporting-frame, of a rocking shaft mounted thereon, a vessel counterpoised on said shaft and having an outlet-valve in its lower part, a scale or weighing beam adjustably secured on and suspended from the counterpoise or adjusting beam, a movable weight on the weighing-beam, a grooved sliding bar having means to engage and move said weight, the latter adapted to be operated by checks of variable lengths, and a mechanism to alternately and simultaneously open and close the inlet and outlet valves, substantially as described.

3. In an automatic liquid-weigher, the combination with the supporting-frame, of a rocking shaft mounted thereon, a vessel counterpoised on said shaft and having an outlet-valve in its lower part, a scale or weighing beam adjustably secured on and suspended from the counterpoise or adjusting beam, a movable weight on the weighing-beam, a sliding bar having a longitudinal V-shaped groove and means to engage and move the said weight, the latter adapted to be operated by V-shaped checks of variable lengths, substantially as described.

4. The combination with the supporting-frame, of a rocking shaft mounted thereon, and having arms or projections, a vessel pivotally secured on said arms, and having an outlet-valve in its lower part, a counterpoise-beam rigidly connected to the rocking shaft, a scale or weighing beam adjustably secured on the counterpoise-beam and suspended therefrom, a movable weight on the weighing-beam, an inlet-valve located above the vessel, a second rocking shaft journaled on the supporting-frame, levers on said shaft to raise the inlet and outlet valves alternately and simultaneously, a grooved sliding bar having means to engage and move the weight on the weighing-beam, the weight adapted to be operated by checks of variable lengths, a connection uniting the sliding bar, and the second rocking shaft, substantially as described.

5. The combination in an automatic liquid-weigher, of a counterpoised vessel, with a weighing-beam suspended from the counterpoise-beam, a movable weight on the weighing-beam, a sliding bar having a longitudinal groove in its upper surface and means to move said weight, the latter adapted to be operated by checks of variable lengths, and an ejector for the controlling-check pivotally secured so as to rest on the upper surface of the sliding bar, substantially as described.

6. The combination with a weighing-beam, of a movable weight thereon, a grooved sliding bar located near the weighing-beam, and having means to move the weight thereon, the weight adapted to be operated by checks of variable lengths, substantially as described.

7. The combination with a weighing-beam, of a movable weight thereon, a grooved sliding bar located near the weighing-beam, and having means to move the weight on said beam, the weight adapted to be operated by checks of variable lengths, and an ejector to remove the check from the groove of the sliding bar, substantially as described.

8. The combination with a weighing-beam, of a movable weight thereon, a grooved sliding bar located near said beam, and having means to move said weight, the latter adapted to be operated by grooved checks of variable lengths, and a guard pivotally secured so as to rest on the upper surface of the sliding bar, and having a projection to correspond in shape with and fit into the groove of the controlling check or piece, substantially as described.

9. The combination with a weighing-beam, of a movable weight thereon, a grooved sliding bar having means to engage and move said weight, the latter adapted to be operated by grooved checks of variable lengths, an ejector and a guard pivotally secured so as to rest on the upper surface of the sliding bar, the said guard having a projection to correspond in shape with and to fit into the groove of the controlling-piece, substantially as described.

GEORGE A. HANNA.
THEODORE A. SWANSON.

Witnesses:
C. B. HOLDRIGE,
JOHN NEWMAN.